US011273785B1

(12) United States Patent
Faruque et al.

(10) Patent No.: US 11,273,785 B1
(45) Date of Patent: Mar. 15, 2022

(54) VEHICLE LAP BAR WITH AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/019,500

(22) Filed: Sep. 14, 2020

(51) Int. Cl.
*B60R 21/015* (2006.01)
*B60R 21/2165* (2011.01)
*B60R 21/231* (2011.01)
*B60R 21/20* (2011.01)
*B60R 21/207* (2006.01)
*B60R 21/232* (2011.01)
*B60N 3/00* (2006.01)
*B60R 21/16* (2006.01)
*B60R 21/02* (2006.01)
*B60R 21/217* (2011.01)

(52) U.S. Cl.
CPC ............ *B60R 21/232* (2013.01); *B60N 3/001* (2013.01); *B60R 21/01512* (2014.10); *B60R 21/20* (2013.01); *B60R 21/207* (2013.01); *B60R 21/2165* (2013.01); *B60R 21/231* (2013.01); *B60R 2021/022* (2013.01); *B60R 2021/0273* (2013.01); *B60R 2021/161* (2013.01); *B60R 2021/2173* (2013.01); *B60R 2021/23107* (2013.01); *B60R 2021/23146* (2013.01)

(58) Field of Classification Search
CPC ............ B60R 21/232; B60R 21/01512; B60R 21/015; B60R 21/2165; B60R 21/231; B60R 21/20; B60R 21/16; B60R 21/207; B60R 21/2072; B60R 2021/23107; B60R 2021/161; B60R 2021/022; B60R 2021/23146; B60R 2021/2173; B60R 2021/0273; B60N 3/001; B60N 3/00; B60N 2/2839; B60N 2/79
USPC .............................. 280/730.2, 730.1, 728.1
See application file for complete search history.

(56) References Cited

U.S. PATENT DOCUMENTS

| 2,861,626 | A | * | 11/1958 | Mills, Jr. ................. B60R 21/02 297/488 |
| 3,623,768 | A | | 11/1971 | Capener et al. |
| 3,953,049 | A | | 4/1976 | Surace et al. |
| 4,508,294 | A | | 4/1985 | Lorch |
| 4,579,385 | A | * | 4/1986 | Koenig .................... B60N 2/28 297/184.12 |
| 4,906,047 | A | | 3/1990 | Mikami |

(Continued)

FOREIGN PATENT DOCUMENTS

| CN | 106696787 A | * | 5/2017 |
| JP | 5664585 B2 | | 2/2015 |
| JP | 5704058 B2 | | 4/2015 |

*Primary Examiner* — Keith J Frisby
(74) *Attorney, Agent, or Firm* — Frank A. MacKenzie; Bejin Bieneman PLC

(57) ABSTRACT

A seat includes a seatback that defines a first axis extending between a top and a bottom of the seatback. The seatback defines a second axis perpendicular to the first axis. The seat includes a lap bar supported by the seatback. The lap bar is translatable along the first axis and rotatable about the second axis. The seat includes an airbag supported by the lap bar.

19 Claims, 8 Drawing Sheets

(56) References Cited

U.S. PATENT DOCUMENTS

| | | | |
|---|---|---|---|
| 5,390,952 A * | 2/1995 | Goor | B60R 21/01 |
| | | | 280/730.1 |
| 5,511,850 A * | 4/1996 | Coursey | B60N 2/2839 |
| | | | 297/216.11 |
| 5,564,736 A | 10/1996 | Kim | |
| 5,720,519 A * | 2/1998 | Barnes | B60N 2/002 |
| | | | 280/728.1 |
| 6,736,455 B1 * | 5/2004 | Zakovic | B60N 2/2839 |
| | | | 297/256.15 |
| 8,087,690 B2 | 1/2012 | Kim | |
| 9,744,932 B1 | 8/2017 | Faruque et al. | |
| 10,023,146 B2 | 7/2018 | Faruque et al. | |
| 10,272,865 B2 | 4/2019 | Nagasawa | |
| 10,343,644 B2 | 7/2019 | Dry et al. | |
| 10,471,920 B2 | 11/2019 | Dry et al. | |
| 10,933,836 B2 * | 3/2021 | Yoo | B60R 21/2338 |
| 2012/0007408 A1 | 1/2012 | Freienstein et al. | |
| 2016/0052477 A1 | 2/2016 | Tobata et al. | |
| 2016/0082915 A1 | 3/2016 | Madaras | |
| 2018/0281723 A1 | 10/2018 | Nagasawa | |
| 2018/0281725 A1 | 10/2018 | Nagasawa | |
| 2019/0061665 A1 * | 2/2019 | Kondrad | B60N 2/427 |
| 2019/0071046 A1 | 3/2019 | Dry et al. | |
| 2019/0077359 A1 | 3/2019 | Kim | |
| 2019/0092264 A1 * | 3/2019 | Spahn | B60R 21/231 |
| 2019/0118755 A1 * | 4/2019 | Dry | B60N 2/14 |

* cited by examiner

VEHICLE LAP BAR WITH AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
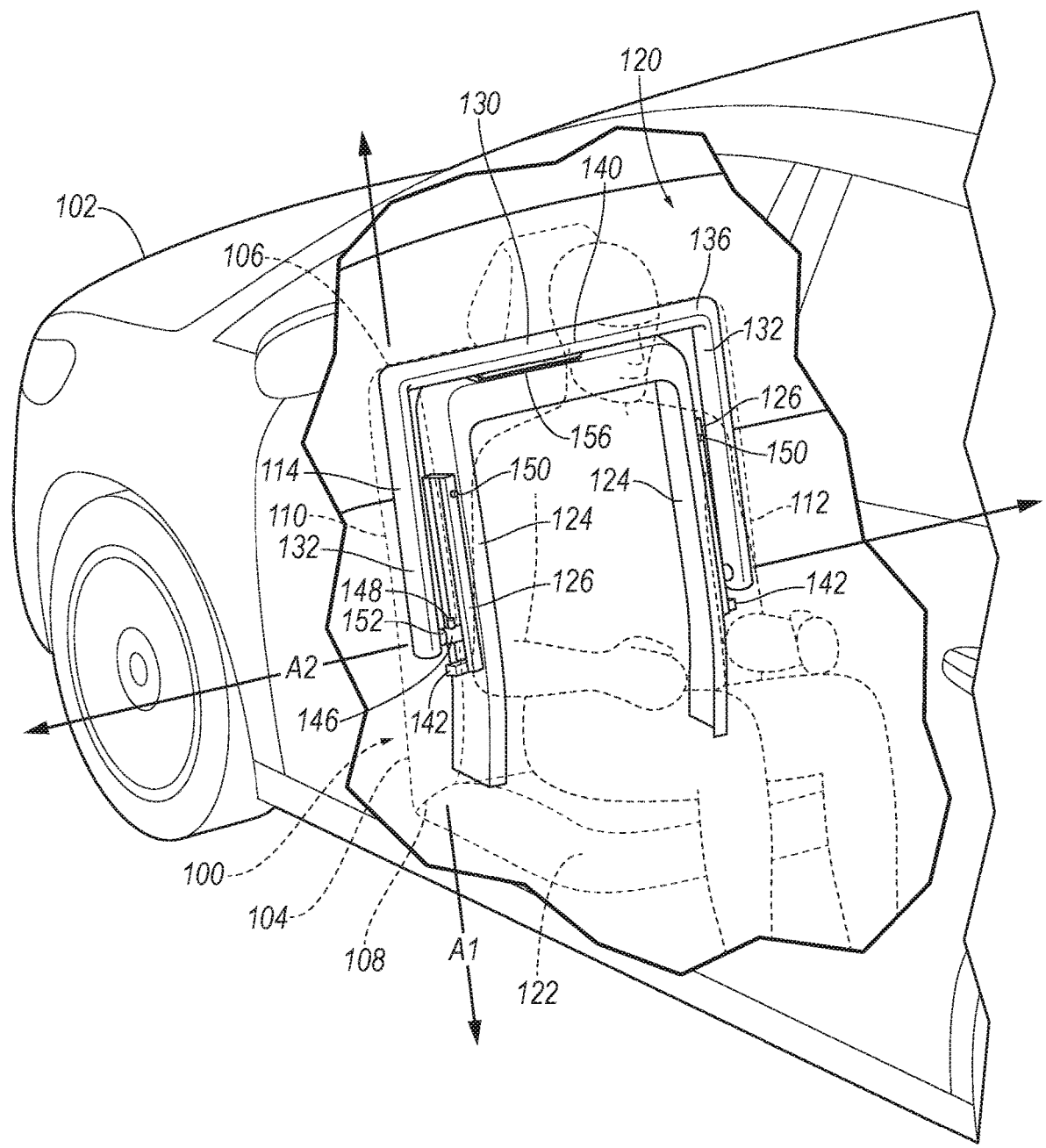
FIG. 1 is a perspective view of a vehicle broken away to show a seat including a lap bar in a bottom raised position.

A seat includes a seatback that defines a first axis extending between a top and a bottom of the seatback, the seatback defining a second axis perpendicular to the first axis. The seat includes a lap bar supported by the seatback, the lap bar translatable along the first axis and rotatable about the second axis. The seat includes an airbag supported by the lap bar.

The seatback may include a track elongated along the first axis, the lap bar slidable along the track.

The seat may include an actuator configured to rotate the lap bar about the second axis.

The seat may include an actuator configured to translate the lap bar along the first axis.

The seat may include a computer having a processor and memory storing instructions executable by the processor to command the actuator to move the lap bar along the first axis in response to receiving data from an occupancy sensor indicating that the seat is occupied.

The seat may include a computer having a processor and memory storing instructions executable by the processor to command the actuator to move the lap bar along the first axis in response to receiving data from a sensor that indicates rotation of the lap bar about the second axis.

The seat may include a computer having a processor and memory storing instructions executable by the processor to command the actuator to move the lap bar along the first axis in response to receiving data from a user interface.

The seat may include a second airbag supported by the lap bar, and the airbag may be inflatable to an inflated position that extends upward from the lap bar and the second airbag may be inflatable to a second inflated position that extends downward from the lap bar.

The lap bar may include a covering having a top tear seam at the airbag and a bottom tear seam at the second airbag.

The lap bar may include a beam, and the seat may include an inflator inside the beam.

The seat may include a lock that selectively inhibits rotation of the lap bar about the second axis.

The lock may include an inertia locking mechanism.

The seat may include a lock that selectively inhibits translation of the lap bar along the first axis.

The lock may include an inertia locking mechanism.

The seat may include a table supported by the lap bar.

The table may be movable between an extended position and a retracted position.

The table in the extended position may extend from the lap bar toward the seatback.

The lap bar may be supported at a right side of the seatback and a left side of the seatback.

The airbag extends from the right side of the seatback along the lap bar to the left side of the seatback.

With reference to FIGS. 1-7, a seat 100 for a vehicle 102 includes a seatback 104 that defines a first axis A1 extending between a top 106 and a bottom 108 of the seatback 104. The seatback 104 defines a second axis A2 perpendicular to the first axis A1, e.g., extending between a right side 110 and a left side 112 of the seatback 104. The seat 100 includes a lap bar 114 supported by the seatback 104. The lap bar 114 is translatable along the first axis A1 and rotatable about the second axis A2. The seat 100 includes a first airbag 116 and/or a second airbag 118 supported by the lap bar 114. The adjectives "first" and "second" are used throughout this document as identifiers and are not intended to signify importance or order.

Figure 7:
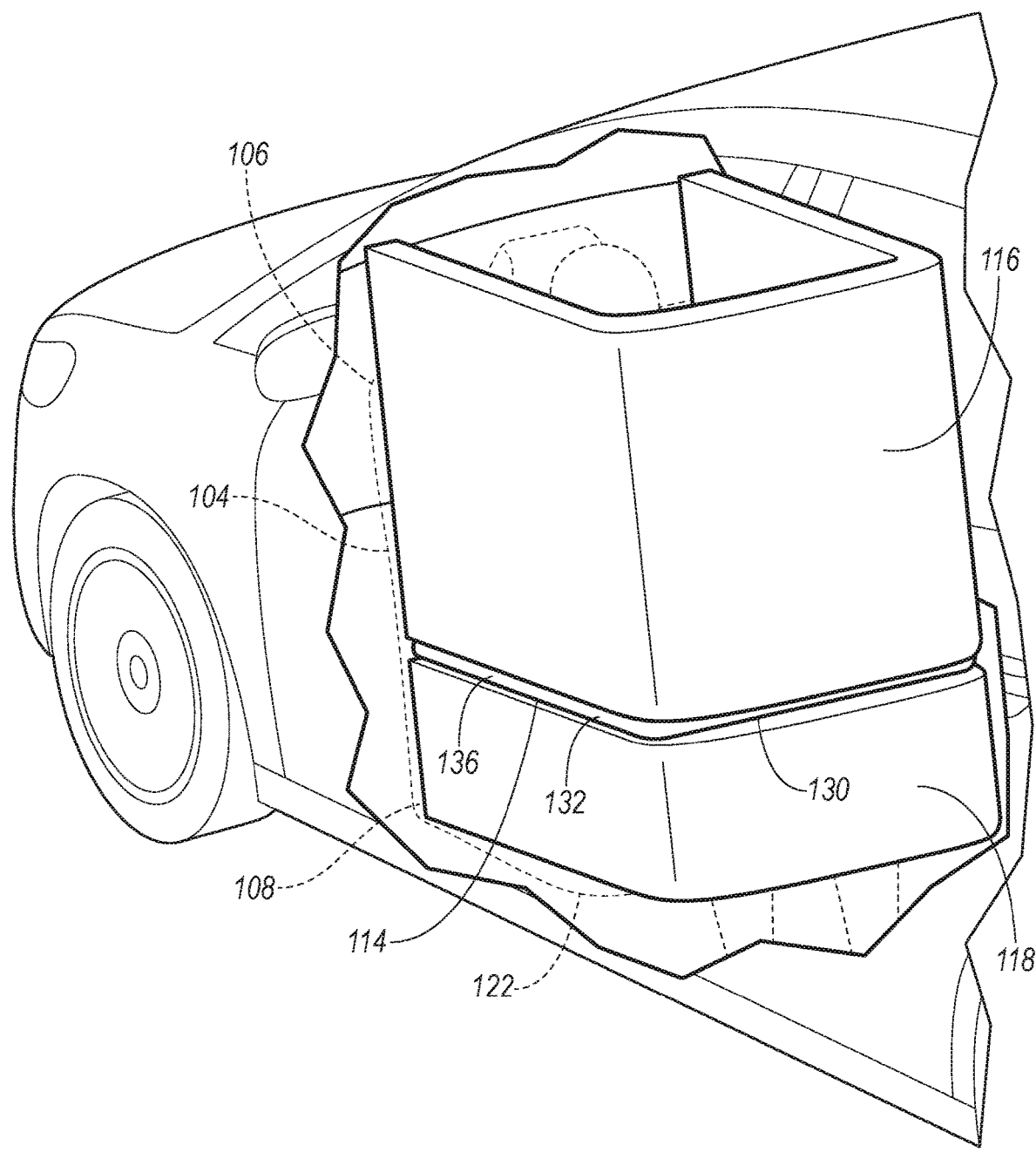
FIG. 7 is a perspective view of the seat including the lap bar in the bottom lowered position and having airbags in inflated positions.

The seat 100 controls kinematics of an occupant seated thereon. For example, the airbags 116, 118 in inflated positions may control kinematics of the occupant during a collision involving the vehicle 102. The lap bar 114 in a first position may position and support the airbags 116, 118, as shown in FIG. 7, to control kinematics of the occupant during such impact. Movement of the lap bar 114, e.g., via translation and/or rotation, to a second position, shown in FIG. 1, permits the occupant to enter and/or exit the seat 100.

The vehicle 102 may be any suitable type of automobile, e.g., a passenger or commercial automobile such as a sedan, a coupe, a truck, a sport utility vehicle, a crossover vehicle, a van, a minivan, a taxi, a bus, etc. The vehicle 102, for example, may be an autonomous vehicle. In other words, the vehicle 102 may be autonomously operated such that the vehicle 102 may be driven without constant attention from a driver, i.e., the vehicle 102 may be self-driving without human input.

The vehicle 102 may define a passenger cabin 120 to house occupants, if any, of the vehicle 102. The passenger cabin 120 may extend across the vehicle 102, i.e., from one side to the other side of the vehicle 102. The passenger cabin 120 includes a front end and a rear end with the front end being in front of the rear end during forward movement of the vehicle 102. The seat 100 may be supported in the passenger cabin 120, e.g., by a floor of the vehicle 102.

The seatback 104 may be supported by the seat bottom 122, e.g., the bottom 108 of the seatback 104 may be at the seat bottom 122 and the top 106 of the seatback 104 may be spaced from the seat bottom 122. The seatback 104 may be stationary or movable relative to the seat bottom 122. The seatback 104 and the seat bottom 122 may be adjustable in multiple degrees of freedom. Specifically, the seatback 104 and the seat bottom 122 may themselves be adjustable, in other words, adjustable components within the seatback 104 and/or the seat bottom 122, and/or may be adjustable relative to each other.

The seatback 104 may include a seatback frame 124 and a covering supported on the seatback frame 124. The seatback frame 124 may include tubes, beams, etc. Specifically, the seatback frame 124 includes a pair of upright frame members. The upright frame members are elongated, and specifically, are elongated in a generally upright direction when the seatback 104 is in a generally upright position. The upright frame members are spaced from each other along the second axis A2. The seatback frame 124 may include cross-members (not shown) extending between the upright frame members. The seatback frame 124, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 124 may be formed of a suitable metal, e.g., steel, aluminum, etc. The covering may include upholstery and padding. The upholstery may be cloth, leather, faux leather, or any other suitable material. The upholstery may be stitched in panels around the frame 124. The padding may be between the covering and the seatback frame 124 and may be foam or any other suitable material.

The seatback 104 can include a track 126, e.g., on each of the right side 110 and the left side 112. The tracks 126 guide translation of the lap bar 114 along the first axis A1. Each track 126 is elongated between distal ends. For example, as illustrated in FIGS. 1-3 and 5, the tracks 126 may be elongated along the first axis A1. In other words, the distal ends of each track 126 may be spaced from each other along the first axis A1, e.g., with one distal end proximate the top 106 of the seatback 104 and the other distal end proximate the bottom 108 of the seatback 104. The tracks 126 are fixed relative to the seatback 104. For example, the tracks 126 may be fixed to the seatback frame 124, e.g., via weld, fastener, etc.

Each track 126 may define a passage elongated along the track 126, e.g., the track 126 may have a C-channel, or any other suitable structure. The track 126 may permit movement of the lap bar 114 along the elongation of the track 126, e.g., along the passage and between the distal ends. The track 126 may restrict movement of the lap bar 114 transverse to the elongation of the track 126. In the Figures, the lap bar 114 is guided via the track 126 on the right side 110 and the track 126 on the left side 112. Although two tracks 126 are shown, a single track on one side of the seat may be used (not shown).

The lap bar 114 may include a middle portion 130 elongated along the second axis A2. The lap bar 114 may include connecting portions 132 elongated between the seatback 104 and the middle portion 130. The lap bar 114 controls kinematics of the occupant of the seat 100 during an impact to the vehicle 102, e.g., when the lap bar 114 is in the first position with the airbags supported by the lap bar 114 in the inflated position, as shown in FIG. 7. The lap bar 114 permits entry and egress of the occupant to and from the seat 100, e.g., when the lap bar 114 is in the second position shown in FIG. 1.

Figure 4:
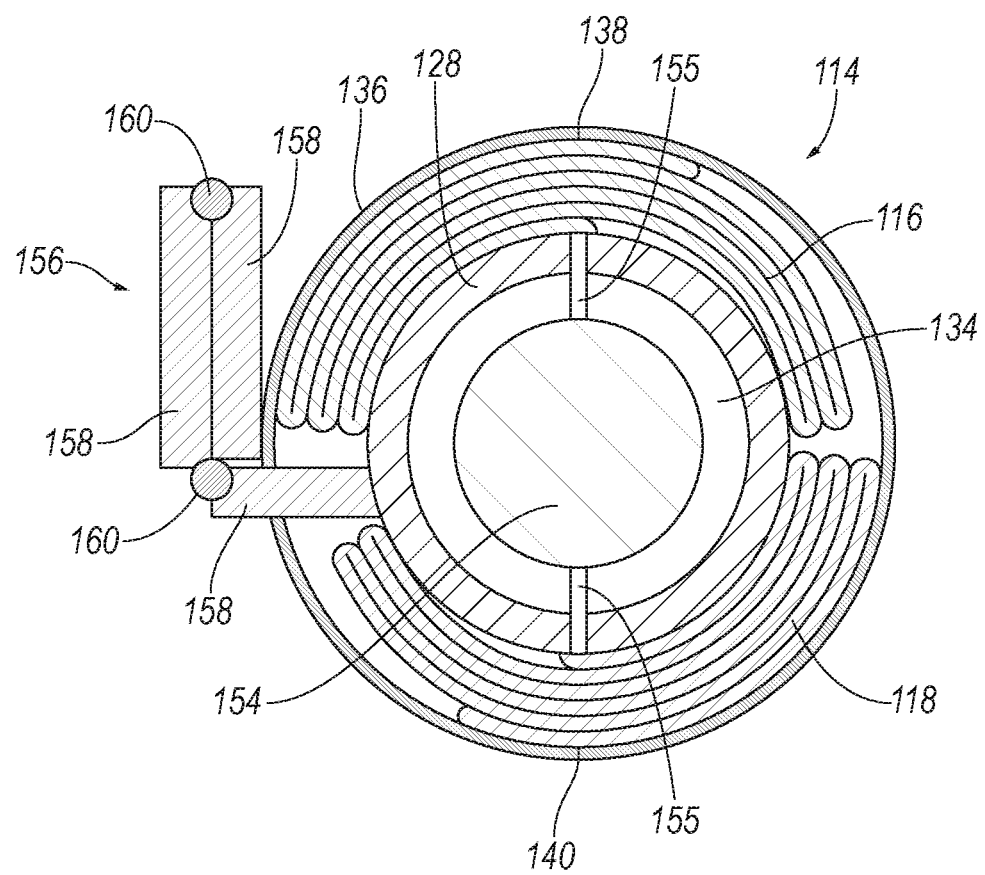
FIG. 4 is a cross-section of the lap bar along the line 4-4 in FIG. 3.
Figure 6:
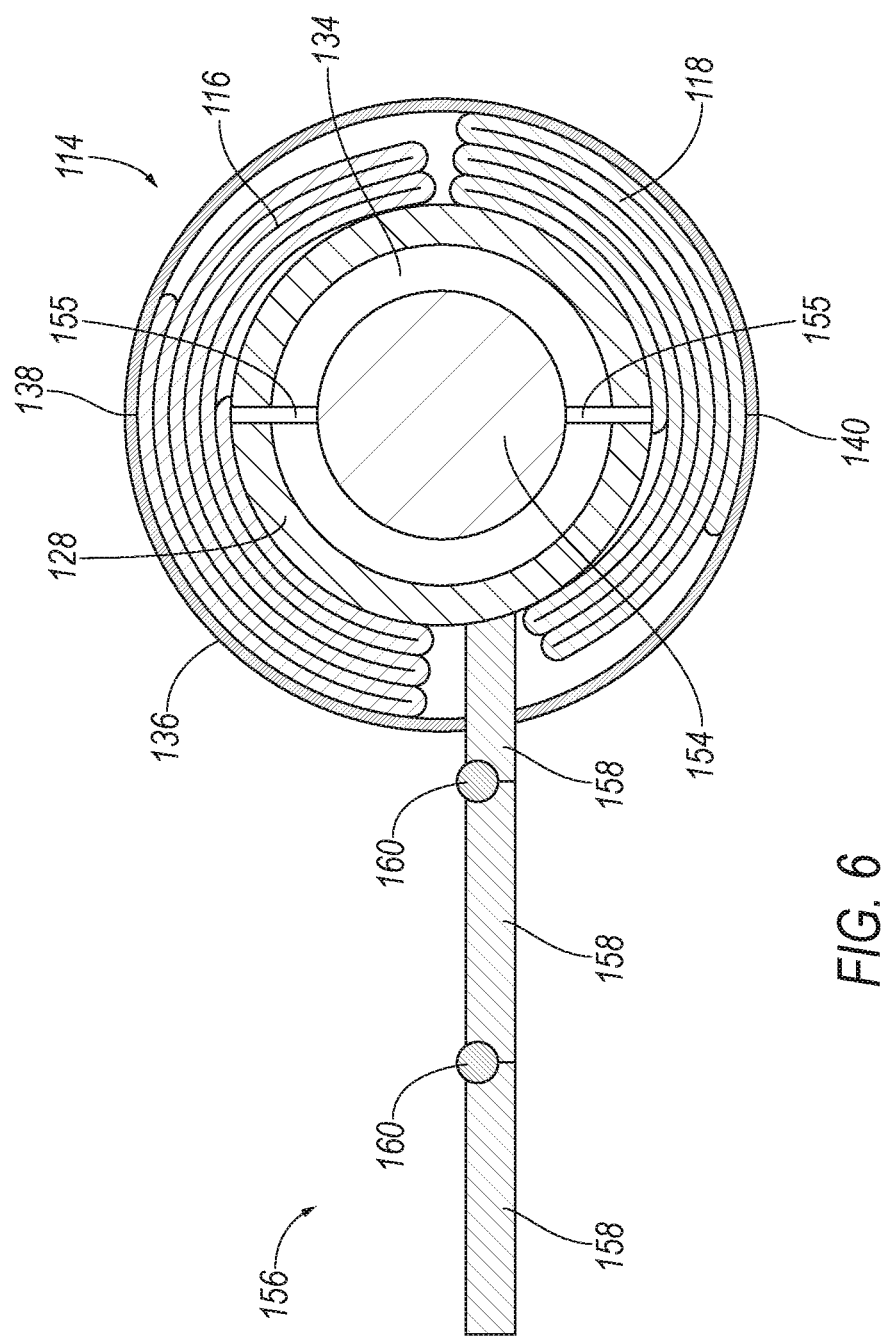
FIG. 6 is a cross-section of the lap bar along the line 6-6 in FIG. 5.

With reference to FIGS. 4 and 6, the lap bar 114 can include a beam 128. The beam 128 supports other components of the seat 100, e.g., the airbags 116, 118. The beam 128 may extend along the middle portion 130 and be elongated along the second axis A2. The beam 128 may extend along the connecting portions 132 elongated between the seatback 104 and the middle portion 130. The beam 128 may be monolithic, i.e., a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc. The beam 128 may be metal, or any suitable material. The beam 128 may define a chamber 134. For example, the beam 128 may be square, circular, or other hollow shape in cross section. The chamber 134 may be surrounded and/or enclosed by the beam 128.

The lap bar 114 can include a covering 136. The covering 136 provides a class-A surface to the lap bar 114, i.e., a finished surface exposed to view by a customer and free of unaesthetic blemishes and defects. The covering 136 may be fabric, or any suitable material. The covering 136 of the lap bar 114 may be a same material as the covering 136 of the seatback 104. The covering 136 may have a top tear seam 138 at the first airbag 116 and a bottom tear seam 140 at the second airbag 118. The top tear seam 138 and bottom tear seam 140 are designed to rupture upon inflation of the respective first airbag 116 and second airbag 118. The top tear seam 138 and the bottom tear seam 140 may be weaker than a portion of the covering 136 adjacent the respective top tear seam 138 and bottom tear seam 140, e.g., the tear seams 138, 140 may be thinner, a weaker material, etc. The tear seams 138, 140 may connect panels of the covering 136, e.g., with breakaway stitches. The top tear seam 138 may extend above and parallel to the beam 128, e.g., along the connecting portions 132 and the middle portion 130. Inflation of the first airbag 116 and the second airbag 118 to their respective inflated positions may rupture the covering 136 at the top tear seam 138 and the bottom tear seam 140.

The lap bar 114 is supported by the seatback 104. For example, the lap bar 114 may be connected to the seatback frame 124 at the right side 110 of the seatback 104 and the left side 112 of the seatback 104. The lap bar 114 may be connected via the track 126 on the ride side of the seatback 104 and the track 126 on the left side 112 of the seatback 104.

Figure 2:
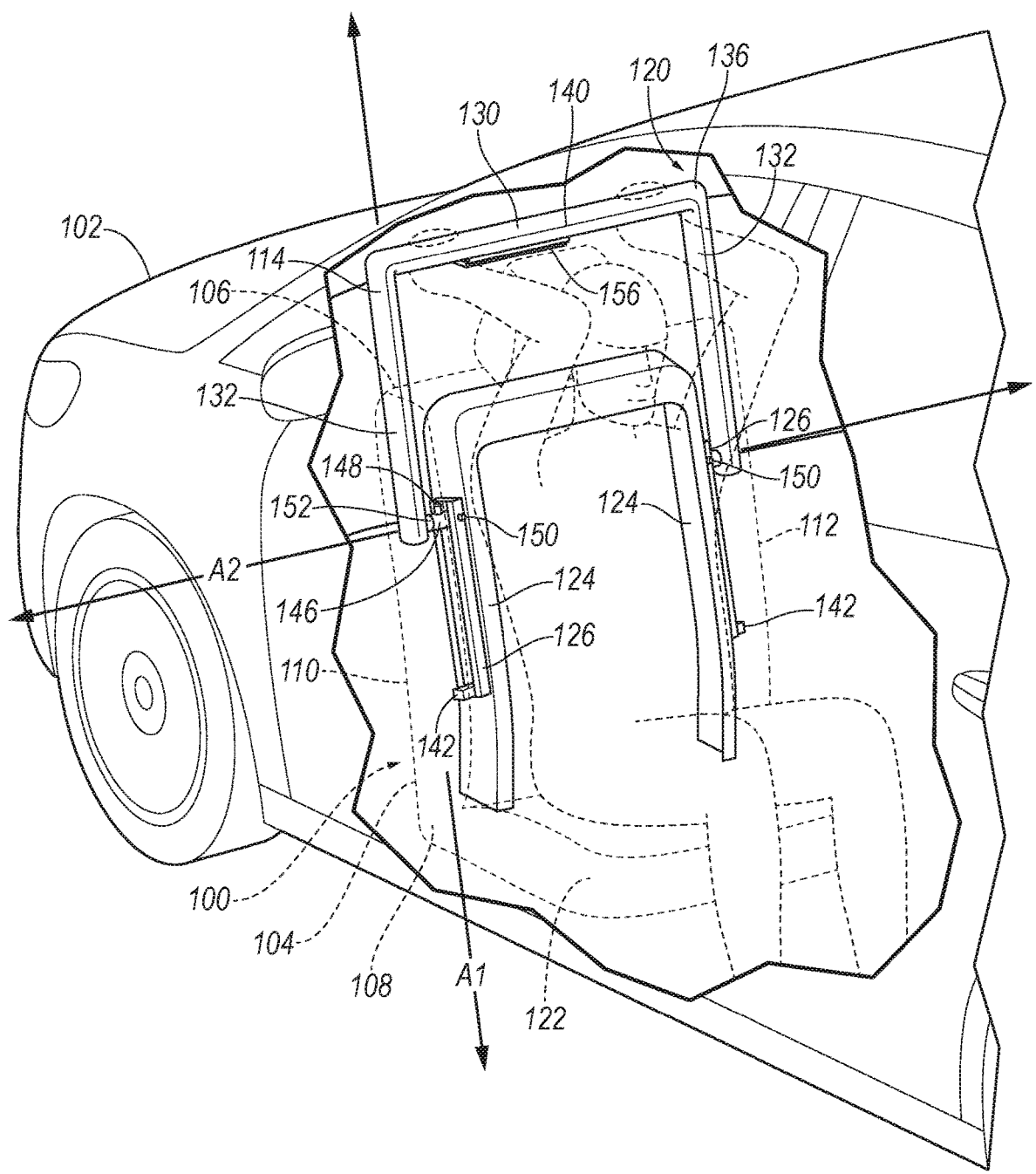
FIG. 2 is a perspective view of the seat including the lap bar in a top position raised position.

The lap bar 114 is translatable along the first axis A1, e.g., between a bottom position shown in FIGS. 1, 3, 5, and 7, and a top position shown in FIG. 2. The lap bar 114 may be slidable along the track 126. For example, the connecting portions 132 of the lap bar 114 may be operatively engaged with the track 126, e.g., via slider block, rollers, and/or other suitable structure, to slide along the track 126.

Figure 3:
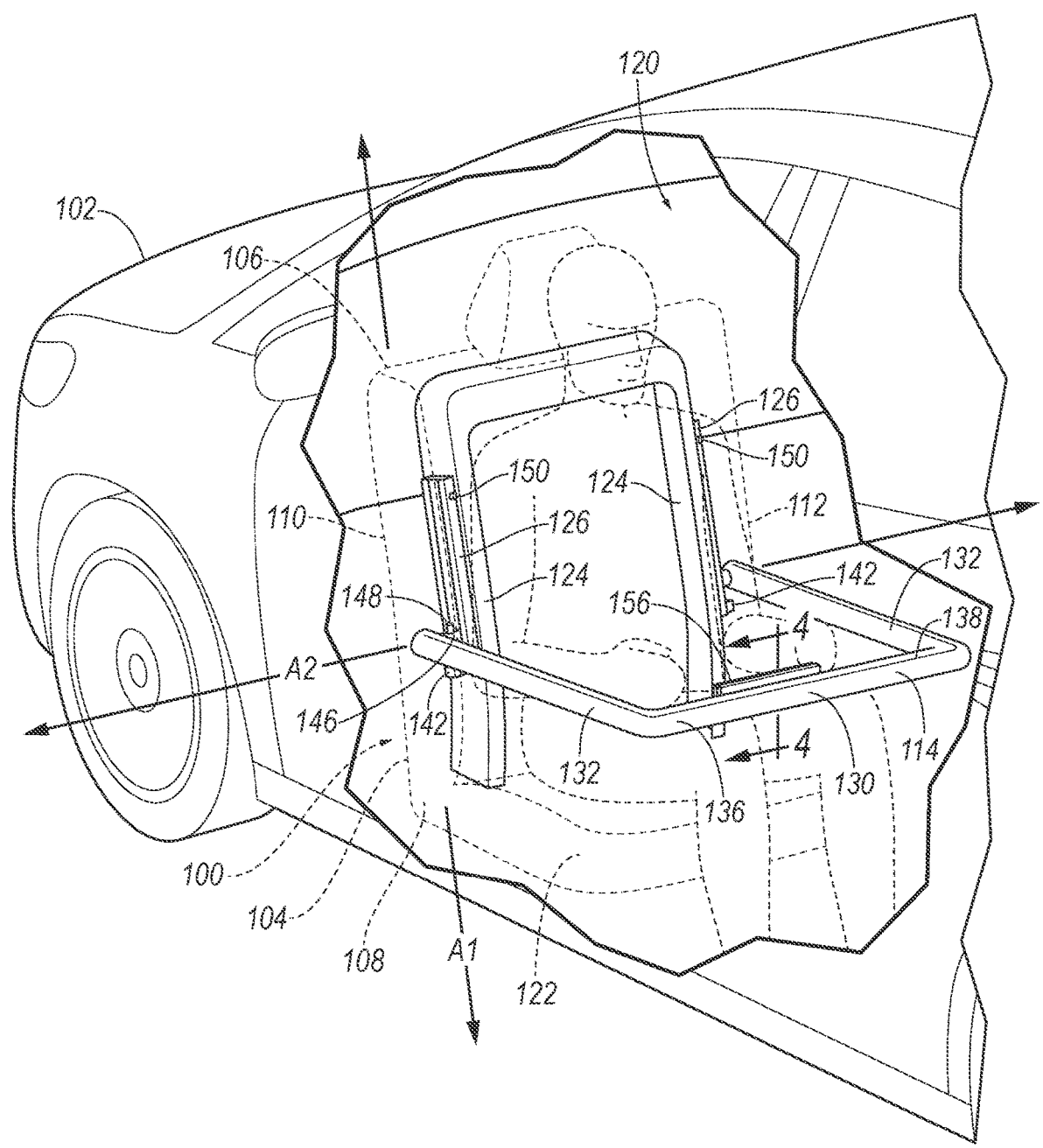
FIG. 3 is a perspective view of the seat including the lap bar in a bottom lowered position and having a table in a retracted position.
Figure 5:
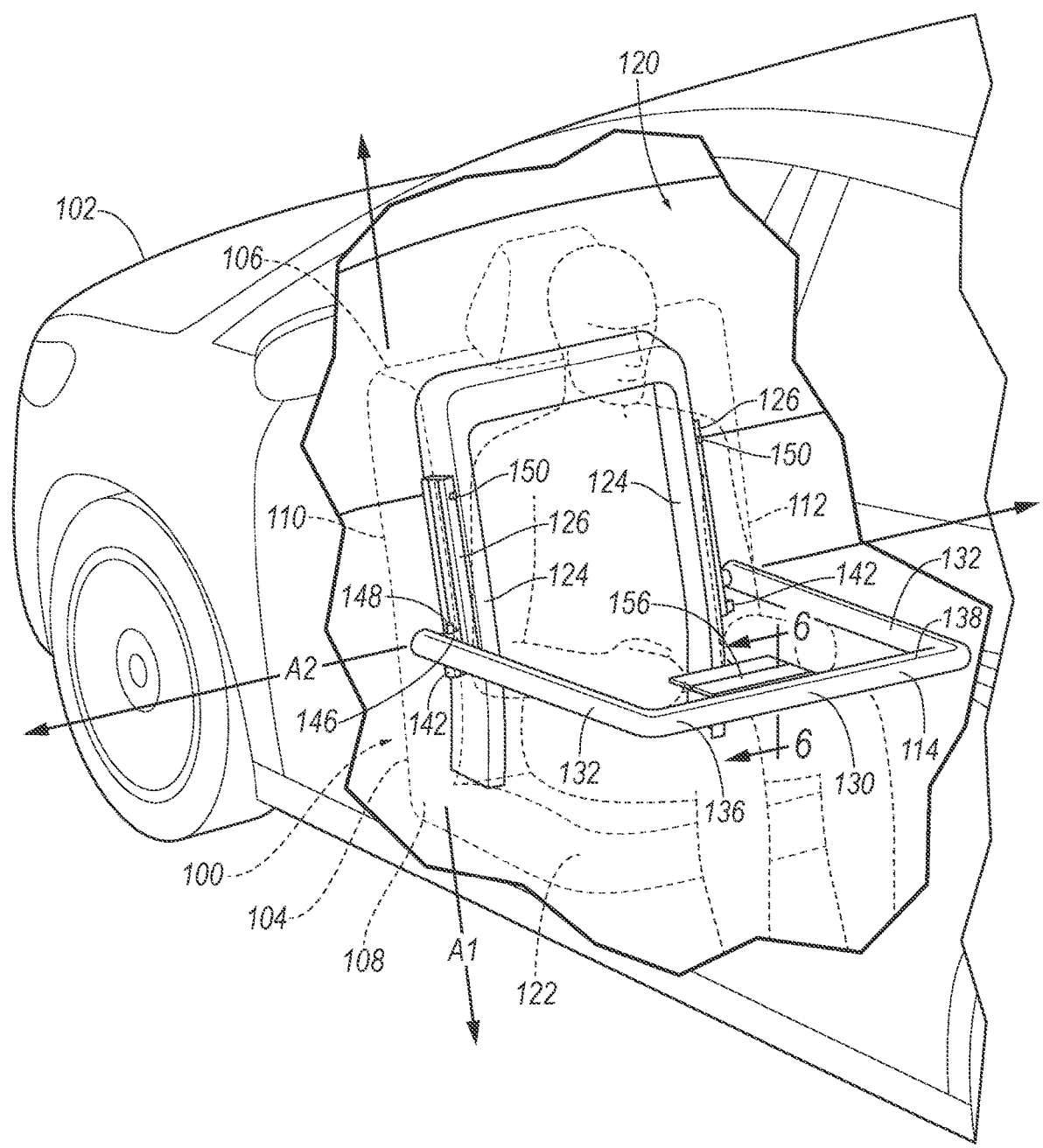
FIG. 5 is a perspective view of the seat including the lap bar in the bottom lowered position and having the table in an extended position.

The lap bar 114 is rotatable about the second axis A2, e.g., between a raised position shown in FIGS. 1 and 2, and a lowered positioned shown in FIGS. 3, 5, and 7. The lap bar 114 may be pivotally supported by the seatback 104. For example, the connecting portions 132 of the lap bar 114 may be connected to the track 126 via bearing, bushing, or other suitable structure such that the lap bar 114 may pivot about the second axis A2 where the lap bar 114 is connected to the track 126.

The seat 100 can include a first actuator 142 configured to translate the lap bar 114 along the first axis A1. The first actuator 142 may include a motor, rack and pinion, worm gear, chain, pulley, cable, or other suitable electro-mechanical structure that can translate the lap bar 114, e.g., along the track 126 between the bottom position and the top position. The first actuator 142 may be in electrical communication with a computer 144, e.g., to receive commands from the computer 144. The first actuator 142 may translate the lap bar 114 to the top position or the bottom position in response to receiving a command from the computer 144.

The seat 100 can include a second actuator 146 configured to rotate the lap bar 114 about the second axis A2. The second actuator 146 may include a motor, a servo, reduction gears, or other suitable electro-mechanical structure that can rotate the lap bar 114 about the second axis A2. The second actuator 146 may rotate the lap bar 114 relative to the track 126, e.g., between the lowered position and the raised position. The second actuator 146 may be in electrical communication with the computer 144, e.g., to receive commands from the computer 144. The second actuator 146 may rotate the lap bar 114 to the lower position or the raised position in response to receiving a command from the computer 144.

The seat 100 may include a sensor 148, such as a switch, proximity sensor, or other suitable structure for detecting a position of the lap bar 114 about the second axis A2, e.g., relative to the seatback 104, the frame 124 and/or the track 126. The sensor 148 may send data specifying the position of the lap bar 114 about the second axis A2 to the computer 144. The sensor 148 may be supported by the track 126, the seatback frame 124, or any suitable structure.

The seat 100 can include a first lock 150 that selectively inhibits translation of the lap bar 114 along the first axis A1. For example, the first lock 150 may permit translation of the lap bar 114 during normal operation, while the vehicle 102 is stopped, etc., and may inhibit translation of the lap bar 114 during an impact to the vehicle 102, when the vehicle 102 is operating above a threshold speed, etc. The first lock 150 in a locked state may inhibit translation. The first lock 150 in an unlocked state may permit translation. The first lock 150 can include an inertia locking mechanism, such as a rack and weighted pawl that engages the rack upon deceleration of the vehicle 102 above a threshold amount. The first lock 150 can include a pin, clamp, actuator, electrical circuits and/or chips, or other suitable structure for selectively inhibiting translation of the lap bar 114 along the first axis A1. The first lock 150 may be in electrical communication with the computer 144, e.g., to send data to the computer 144 and to receive commands from the computer 144. The first lock 150 may send data specifying the position of the first lock 150, e.g., locked or unlocked. The first lock 150 may move to the locked position or the unlocked position in response to receiving a command from the computer 144.

The seat 100 can include a second lock 152 that selectively inhibits rotation of the lap bar 114 about the second axis A2. For example, the second lock 152 may permit rotation of the lap bar 114 during normal operation, while the vehicle 102 is stopped, etc., and may inhibit rotation of the lap bar 114 during an impact to the vehicle 102, when the vehicle 102 is operating above a threshold speed, etc. The second lock 152 in an unlocked state may inhibit rotation. The second lock 152 in an unlocked state may permit rotation. The second lock 152 can include an inertia locking mechanism, such as a ratchet and weighted pawl that engages the ratchet upon deceleration of the vehicle 102 above a threshold amount. The second lock 152 can include a pin, clamp, actuator, or another suitable structure for selectively inhibiting rotation of the lap bar 114 about the second axis A2. The second lock 152 may be in electrical communication with the computer 144, e.g., to send data to the computer 144 and to receive commands from the computer 144. The second lock 152 may send data specifying the position of the second lock 152, e.g., locked or unlocked.

The first lock 150 may move to the locked position or the unlocked position in response to receiving a command from the computer.

The first airbag 116 and the second airbag 118 are inflatable from uninflated positions (shown in FIGS. 1-6) to inflated positions (shown in FIG. 7), e.g., when filled with inflation medium from an inflator 154. The first airbag 116 and the second airbag 118 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The first airbag 116 and the second airbag 118 are supported by the lap bar 114. The first airbag 116 may be fixed to a top of the beam 128. The second airbag 118 may be fixed to a bottom of the beam 128.

The first airbag 116 and the second airbag 118 in the uninflated positions extend along the lap bar 114. For example, the first airbag 116 in the uninflated position may extend along the connecting portions 132 and the middle portion 130 between the beam 128 and the top tear seam 138 of the covering 136. The second airbag 118 in the uninflated position may extend along the connecting portions 132 and the middle portion 130 between the beam 128 and the bottom tear seam 140 of the covering 136.

The first airbag 116 in the inflated position extends upward from the lap bar 114. For example, the first airbag 116 in the inflated position may extend from the top of the beam 128 and away from the seat bottom 122. The second airbag 118 in the inflated position extends downward from the lap bar 114. For example, the second airbag 118 in the inflated position may extend from the bottom of the beam 128 and toward the seat bottom 122.

The first airbag 116 and the second airbag 118 in the inflated positions control kinematics of the occupant in the seat 100. The first airbag 116 and the second airbag 118 in the inflated positions may extend from the right side 110 of the seat 100 and along the lap bar 114 to the left side 112 of the seat 100. For example, the first airbag 116 and the second airbag 118 in the inflated positions may extend along the connecting portions 132 and the middle portion 130, e.g., surrounding left, right, and front sides of the occupant.

The inflator 154 is in fluid communication with the first airbag 116 and the second airbag 118. The inflator 154 expands the first airbag 116 and the second airbag 118 with inflation medium, such as a gas, to move the first airbag 116 and the second airbag 118 from the uninflated positions to the inflated positions. The inflator 154 for inflating the first airbag 116 and the second airbag 118 may be inside the beam 128, e.g., in the chamber 134 defined by the beam 128. The inflator 154 may be fixed to the beam 128, e.g., via one or more fasteners, brackets, and/or other suitable structure. Additionally or alternately, the inflator 154 may be supported by any suitable component. The inflator 154 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 154 may be connected to the airbags 116, 118, e.g., via fill tubes 155 or the like. Inflation medium from the inflator 154 may flow through the fill tubes 155 to the airbags 116, 118. The seat 100 may include multiple inflators, e.g., one inflator 154 for the first airbag 116 and another inflator 154 for the second airbag 118.

The seat 100 can include a table 156. The table 156 provides a working surface for the occupant of the seat 100, e.g., to support a smart phone, book, tablet computer, etc.

The table 156 may be supported by the lap bar 114, e.g., fixed to the beam 128. The table 156 is movable between a retracted position, shown in FIGS. 3 and 4, and an extended position, shown in FIGS. 5 and 6. The table 156 in the retracted position is stowed proximate the lap bar 114. The table 156 in the extended position extends from the lap bar 114 toward the seatback 104, e.g., providing the working surface to the occupant. For example, the table 156 may include rigid panels 158 connected by hinges 160. The hinges 160 may be at a top of the table 156 in the extended position. The hinges 160 may permit the rigid panels 158 to pivot relative to each other to move the table 156 from the extended position to the retracted position, and vice versa. The rigid panels 158 may abut each other in the extended position, limiting movement of the rigid panels 158 relative to each other about the hinges 160.

Figure 8:
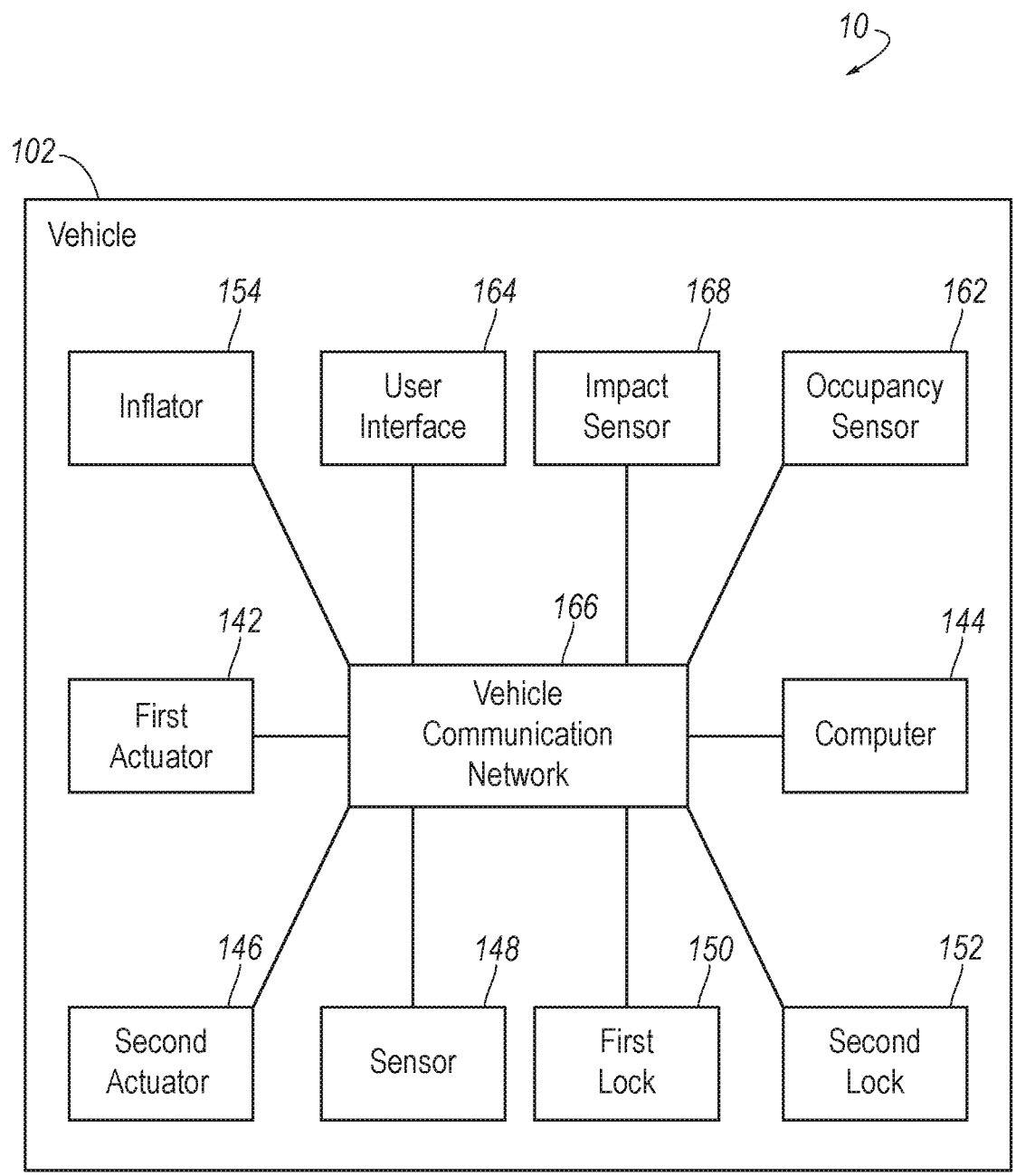
FIG. 8 is a block diagram of components of the vehicle.

With reference to FIG. 8, the vehicle 102 may include an occupancy sensor 162 configured to detect occupancy of the seat 100. The occupancy sensor 162 may be visible-light or infrared cameras directed at the seat 100, weight sensors supported by the seat bottom 122, sensors detecting whether a seatbelt for the seat 100 is buckled or unspooled, or other suitable sensors. The occupancy sensor 162 provides data to the computer 144 specifying whether the seat 100 is occupied or unoccupied.

The vehicle 102 may include an impact sensor 168. The impact sensor 168 is configured to detect an impact to the vehicle 102. The impact sensor 168 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 168 may be located at numerous points in or on the vehicle.

The vehicle 102 may include a user interface 164. The user interface 164 presents information to and receives information from an occupant of the vehicle 102. The user interface 164 may be located, e.g., on the instrument panel in a passenger cabin of the vehicle 102, or wherever may be readily accessed by the occupant. The user interface 164 may include dials, digital readouts, screens such as a touch-sensitive display screen, speakers, and so on for providing information to the occupant, e.g., human-machine interface (HMI) elements. The user interface may include buttons, knobs, keypads, microphone, and so on for receiving information from the occupant. The user interface 164 may be in communication with the computer.

The vehicle 102 may include a communication network 166. The communication network 166 includes hardware, such as a communication bus, for facilitating communication among components, e.g., the first actuator 142, the second actuator 146, the inflator 154, the occupancy sensor 162, the impact sensor 168, the computer 144, the user interface 164, etc. The communication network 166 may facilitate wired or wireless communication among the components in accordance with a number of communication protocols such as controller area network (CAN), Ethernet, WiFi, Local Interconnect Network (LIN), and/or other wired or wireless mechanisms.

The computer 144 is a microprocessor-based controller implemented via circuits, chips, or other electronic components. The computer 144 includes a processor and a memory such as are known. The memory includes one or more forms of computer readable media, and stores instructions executable by the computer 144 for performing various operations, including as disclosed herein. The computer 144 may be programmed to execute operations disclosed herein. Specifically, the memory stores instructions executable by the processor to execute the operations disclosed herein and electronically stores data and/or databases. electronically storing data and/or databases. For example, the computer 144 may include one or more dedicated electronic circuit including an ASIC (Application Specific Integrated Circuit) that is manufactured for a particular operation. In another example, the computer 144 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 144 may be a set of computers communicating with one another.

The computer 144 is generally arranged for communications on the communication network 166 that can include a bus in the vehicle 102 such as a controller area network (CAN) or the like, and/or other wired and/or wireless mechanisms. Via the communication network 166, the computer 144 may transmit messages to various devices in the vehicle 102 and/or receive messages (e.g., CAN messages) from the various components. In cases where the computer 144 actually comprises a plurality of devices, the communication network 166 may be used for communications between devices represented as the computer 144 in this disclosure.

The computer 144 is programmed to, i.e., the memory stores instructions executable by the processor to, command the lap bar 114 to translate along the first axis A1 to the bottom position or the top position and/or to rotate about the second axis A2 to the raised or lowered position. The computer 144 may translate and/or rotate the lap bar 114 by commanding the first actuator 142 and/or the second actuator 146 via the communication network 166. The commands may specify a position, e.g., the bottom 108 position, the top 106 position, the lowered position, or the raised position.

The computer 144 may command first actuator 142 to translate the lap bar 114 in response to receiving data from the sensor 148 that detects rotation of the lap bar 114. For example, the computer may command the lap bar to the top position upon receiving data indicating rotation of the lap bar 114 (e.g. by the occupant) about the second axis A2 toward the raised position. As another example, the computer 144 may command the lap bar to the bottom position upon receiving data indicating rotation of the lap bar 114 (e.g. by the occupant) about the second axis A2 toward the lowered position.

The computer 144 may command the first actuator 142 to move the lap bar 114 along the first axis A1 and/or the second actuator 146 to rotate the lap bar 114 about the second axis A2 in response to receiving data from the user interface 164. For example, the occupant may provide an input to the user interface 164 indicating a desire for the lap bar 114 to be in the top or bottom position, and/or the raised or lowered position. Upon receiving such input the user interface 164 may send data specifying such indication to the computer 144, e.g., via the communication network 166. Upon receiving the data specifying such indication, the computer 144 may command the first actuator 142 to translate the lap bar 114 to the respective top or bottom position and/or command the second actuator 146 to rotate the lap bar 114 to the respective lowered or raised position.

The computer 144 may command the first actuator 142 to move the lap bar 114 along the first axis A1 and/or the second actuator 146 to rotate the lap bar 114 about the second axis A2 in response to receiving data from the occupancy sensor 162 indicating that the seat 100 is occupied. For example, the occupant may enter the seat 100 when the lap bar 114 is in a bottom raised position, i.e., the bottom position along the first axis A1 and the raised position about the second axis A2. After the occupant has occupied the seat 100, the occupancy sensor 162 may transmit data specifying that it detected the occupant to the computer 144, e.g., that the seat 100 is occupied. Upon receiving such data, the computer 144 may move the lap bar 114 to the top position by commanding the first actuator 142 to translate the lap bar 114 along the first axis A1. Once the lap bar 114 is at the top position, the computer 144 may command the second actuator 146 to rotate the lap bar 114 to the lowered position. Once the lap bar 114 is in the lowered position, the computer 144 may command the first actuator 142 to translate the lap bar 114 along the first axis A1.

In operation under normal operating conditions of the vehicle 102, the airbags 116, 118 are in the uninflated positions. In the event of an impact, the impact sensor 168 may detect the impact and transmit a signal through the communication network 166 to the computer 144, and the computer 144 may transmit a signal through the communication network 166 to the inflator 154. In response to receiving such signal, the inflator 154 may discharge and inflate the airbags 116, 118 to the inflated positions to control kinematics of the seat 100 and/or the occupant. Additionally, in the event of an impact and in response to receiving the signal from the impact sensor 168, the computer 144 may command the first lock 150 and/or the second lock 152 to the locked positions, e.g., to inhibit movement of the lap bar 114 during the impact.

Computing devices, such as the computer 144, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat, comprising:
   a seatback that defines a first axis extending between a top and a bottom of the seatback, the seatback defining a second axis perpendicular to the first axis;
   a lap bar supported by the seatback, the lap bar translatable along the first axis and rotatable about the second axis; and
   an airbag supported by the lap bar.

2. The seat of claim 1, wherein the seatback includes a track elongated along the first axis, the lap bar slidable along the track.

3. The seat of claim 1, further comprising an actuator configured to rotate the lap bar about the second axis.

4. The seat of claim 1, further comprising an actuator configured to translate the lap bar along the first axis.

5. The seat of claim 4, further comprising a computer having a processor and memory storing instructions executable by the processor to command the actuator to move the lap bar along the first axis in response to receiving data from an occupancy sensor indicating that the seat is occupied.

6. The seat of claim 4, further comprising a computer having a processor and memory storing instructions executable by the processor to command the actuator to move the lap bar along the first axis in response to receiving data from a sensor that indicates rotation of the lap bar about the second axis.

7. The seat of claim 4, further comprising a computer having a processor and memory storing instructions executable by the processor to command the actuator to move the lap bar along the first axis in response to receiving data from a user interface.

8. The seat of claim 1, further comprising a second airbag supported by the lap bar, and wherein the airbag is inflatable to an inflated position that extends upward from the lap bar and the second airbag is inflatable to a second inflated position that extends downward from the lap bar.

9. The seat of claim 8, wherein the lap bar includes a covering having a top tear seam at the airbag and a bottom tear seam at the second airbag.

10. The seat of claim 1, wherein the lap bar includes a beam, and further comprising an inflator inside the beam.

11. The seat of claim 1, further comprising a lock that selectively inhibits rotation of the lap bar about the second axis.

12. The seat of claim 11, wherein the lock includes an inertia locking mechanism.

13. The seat of claim 1, further comprising a lock that selectively inhibits translation of the lap bar along the first axis.

14. The seat of claim 13, wherein the lock includes an inertia locking mechanism.

15. The seat of claim 1, further comprising a table supported by the lap bar.

16. The seat of claim 15, wherein the table is movable between an extended position and a retracted position.

17. The seat of claim 16, wherein the table in the extended position extends from the lap bar toward the seatback.

18. The seat of claim 1, wherein the lap bar is supported at a right side of the seatback and a left side of the seatback.

19. The seat of claim 18, wherein the airbag extends from the right side of the seatback along the lap bar to the left side of the seatback.

* * * * *